Nov. 22, 1927.
A. S. RAIRDEN
1,649,855
METHOD OF WELDING WIRE ROPE ENDS
Filed Dec. 10, 1924
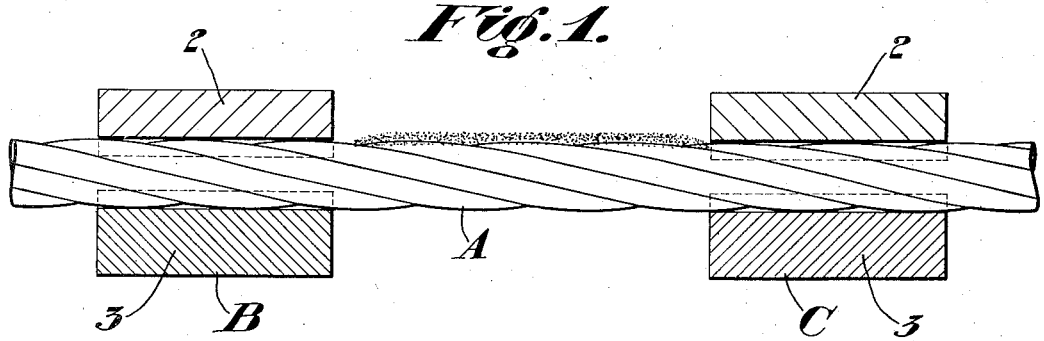
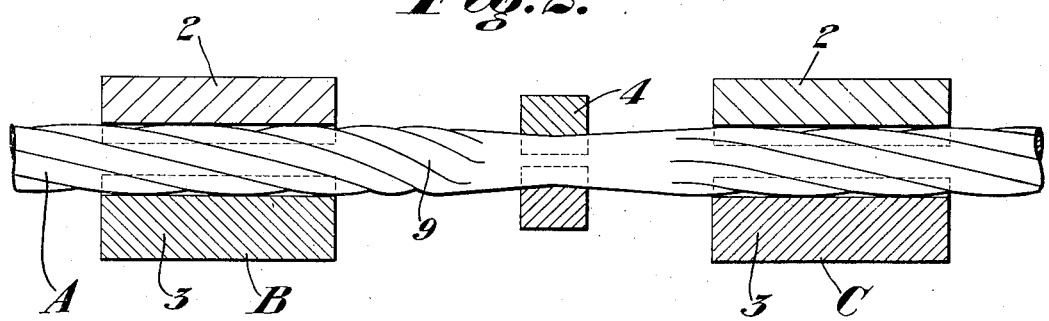
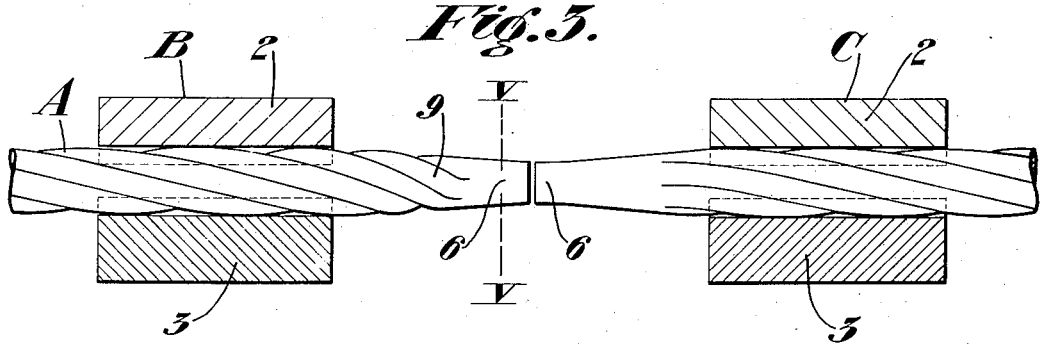
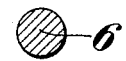
Witnesses:
Edwin Trueb
Inventor:
ALBERT S. RAIRDEN,
by D. Anthony Usina
his Attorney.

Patented Nov. 22, 1927.

1,649,855

UNITED STATES PATENT OFFICE.

ALBERT S. RAIRDEN, OF WORCESTER, MASSACHUSETTS, ASSIGNOR TO THE AMERICAN STEEL AND WIRE COMPANY OF NEW JERSEY, A CORPORATION OF NEW JERSEY.

METHOD OF WELDING WIRE-ROPE ENDS.

Application filed December 10, 1924. Serial No. 755,002.

This invention relates to a method of forming welded and tapered ends on wire rope, and has for its object the provision of an improved method of forming such ends so that all the several strands will be welded into a single homogeneous mass.

Another object of my invention is to provide a method of forming welded and tapered ends on wire rope, which will be simple, efficient, and rapid in operation, and will produce a more perfectly welded end than methods heretofore employed.

The several steps of the process are illustrated in the accompanying drawings, in which—

Figure 1 is a sectional elevation through a pair of dies showing a section of wire rope being heated to a welding heat with flux spread thereon.

Figure 2 is a similar view showing the rope gripped by a clamp intermediate the ends of the heated section and showing the lay of the rope strands shortened at one side of the clamp due to twisting the rope.

Figure 3 shows the rope severed intermediate the ends of the welded portion.

Figure 4 is a transverse section through a piece of the rope showing its cross section before welding.

Figure 5 is a similar view through the welded end as at V—V of Figure 3.

In carrying out my invention the portion of the rope A which is to be formed into welded and tapered ends is secured in dies B and C which form the opposite poles of any suitable electric welding machine (not shown). The upper half 2 of each of the dies is composed of steel, while the lower half 3 of each of the dies is composed of copper, so that the electric current will not meet with material resistance until it flows into the steel rope or cable.

The die B is preferably mounted for rotation, while the die C is stationary to provide means for twisting the cable or rope during the formation of the ends.

The cable or rope A may be of any desired construction. However, this invention pertains particularly to the formation of ends on ropes having hemp center or core strands 8, as shown in Figure 4.

The first step of my method consists in removing the hemp center strand 8 of the rope, which may be removed in any manner desired. However, I prefer to remove this hemp center strand or core by burning. That is, after the cable is mounted in the dies B and C, I apply sufficient current through the dies to heat the portion of cable or rope between said dies to a sufficiently high temperature to burn out the hemp core or center strand. After the hemp center strand is removed by burning or otherwise, I then reheat the cable or rope to an annealing temperature by again applying current through the dies B and C, and then allow the cable to slowly cool.

After the cable or rope has been thus annealed I again heat the cable to a welding heat by applying current through the dies B and C, and during such heating, or after the welding temperature has been reached I apply a suitable flux in sufficient quantity to saturate the rope, as shown in Figure 1.

After the portion of the rope A between the dies B and C has been heated to a welding heat and the flux has been applied, the strands of the rope are forced into welding contact intermediate the ends of the heated portion by applying a suitable clamp or other suitable tool 4, as shown in Figure 2, which may be a part of the welding machine or a separate tool, as desired.

After the clamp 4 has been applied and the rope is firmly gripped thereby, the die B will be rotated to rotate the rope and shorten the lay of the strands between the die B and clamp 4, as shown at 9 in Figures 2 and 3, thus further forcing the strands of the rope into welding contact and forming a solid homogeneous mass from the several strands, as shown in the sectional view of Figure 5.

After the cable or rope has been welded in this manner, the clamp 4 is removed and the welded portion of the cable or rope severed intermediate its ends, completing the operation of forming welded and tapered ends 6.

While I have described a specific manner of carrying out my invention, it will be expressly understood that I do not wish to be limited thereto, since various other ways may be employed in carrying out the several steps of my invention than those described and illustrated. It will also be understood that I do not wish to be limited to the formation of ends on cables or ropes having hemp core or center strands, since said invention may be applied to other forms of ropes or cables.

I claim—

1. The method of welding and tapering the ends of wire rope, which consists in heating the rope to an annealing temperature, then slowly cooling the rope, then again heating the rope to a welding heat, then adding sufficient flux to saturate the rope, then forcing the strands of the rope together, and finally twisting the rope to shorten the lay and thus further force the strands together, forming a welded and tapered end.

2. A method of forming welded and tapered ends on wire rope, which consists in heating the portion of the rope to form the ends to an annealing temperature, slowly cooling said rope, then again heating said rope to a welding heat and adding sufficient flux to saturate the heated rope, then forcing the strands of the rope together to form a weld, and finally severing the welded portion of the rope.

3. A method of forming welded and tapered ends on wire rope, which includes the following steps, heating the portion of the rope to form the ends to a welding heat, then revolving the heated portion of the rope to shorten the lay and force the strands into welding contact, and finally severing the rope intermediate the ends of the welded portion.

4. A method of forming welded and tapered ends on wire rope, which includes the following steps, removing the center or core strand from the portion of the rope which is to form the ends, heating said portion of the rope to a welding heat and adding sufficient flux to saturate the heated rope, then revolving the heated portion of the rope to shorten the lay and force the strands into welding contact, and finally severing the rope intermediate the ends of the welded portion.

5. A method of forming welded and tapered ends on wire rope, which includes the following steps, removing the center or core strand from the portion of the rope which is to form the ends, heating said portion of the rope to an annealing temperature, slowly cooling said rope, then again heating said portion of rope to a welding heat and adding sufficient flux to saturate the heated rope, then forcing the strands of the rope into welding contact, and finally severing the rope intermediate the ends of the welded portion.

6. A method of forming welded and tapered ends on wire rope having a hemp center or core strand, which consists in heating the portion of the rope which is to form the ends to a temperature sufficient to burn out said hemp center strand, then reheating said portion of rope to an annealing temperature, then slowly cooling the rope to anneal it, then reheating said poriton of rope to a welding heat and adding sufficient flux to saturate the heated strands, then forcing the strands of the rope together intermediate the ends of said heated portion, then twisting the rope to shorten the lay of said heated portion and further force the strands into welding contact, and finally severing the rope intermediate the ends of the welded portion.

In witness whereof I have hereunto signed my name.

ALBERT S. RAIRDEN.